United States Patent
Wang

(10) Patent No.: US 6,351,224 B1
(45) Date of Patent: Feb. 26, 2002

(54) ENCODING DEVICE

(76) Inventor: Sen-Cheng Wang, 8F, No.61-8, Ghing Ping Rd., Chung-Ho, Taipei Hsien (TW)

(*) Notice: Subject to any disclaimer, the term of this patent is extended or adjusted under 35 U.S.C. 154(b) by 0 days.

(21) Appl. No.: 09/657,000

(22) Filed: Sep. 7, 2000

(51) Int. Cl.⁷ .................................................. H03M 1/22
(52) U.S. Cl. ................................................ 341/2; 345/167
(58) Field of Search .................. 341/2, 9, 15; 356/3.01, 356/3.09; 345/167, 164

(56) References Cited

U.S. PATENT DOCUMENTS 4,920,341 A * 4/1990 Aoki et al. ................... 341/15
5,096,289 A * 3/1992 Mogamiya et al. ......... 356/3.01
6,144,370 A * 11/2000 Eleyan et al. ................ 345/167

* cited by examiner

Primary Examiner—Peguy Jeanpierre
Assistant Examiner—Jean Bruner Jeanglaude

(57) ABSTRACT

An encoding device in which signals generated thereof can be efficiently propagated comprises a housing and a tracing ball rotatably arranged on said housing. An encoding assembly including a pair of encoding wheels is mechanically arranged adjacent to said tracing ball and driven by said tracing ball. Pairs of light emitters and receivers are arranged respectively to each encoding wheel. A gearing including first and second gears is arranged between the tracing ball and the encoding assembly. The teeth number of the first gear is smaller than the second gear, such that the rotations of the encoding wheel can be considerably increased.

1 Claim, 3 Drawing Sheets

ENCODING DEVICE

BACKGROUND OF THE INVENTION

1. Field of the Invention

The present invention relates to an encoding device, and more particular to an encoding device in which a gearing is incorporated such that signal generated thereof can be efficiently propagated.

2. Description of the Prior Art

In order to quickly and accurately move the cursor on the screen to execute the "functions" of a program or to a certain position, an encoder is incorporated to generate signals that can be used to move the cursor vertically and horizontally. Conventionally, as shown in FIG. 3, a mouse generally includes an encoding mechanism which includes a tracing ball 1, and a pair of sensors 2 arranged perpendicularly to each other. Each sensor 2 includes a shaft 21, an encoding wheel 22 fixedly attached to an end of the shaft 21, and an optic transceiver 23, including a light emitter 231 and a light receiver 232, arranged adjacent to the encoding wheel 22. The shaft 21 includes a contacting portion 211 which is in contact with the tracing ball 1. Accordingly, the shaft 21 is rotated as the tracing ball 21 is moved. While the shaft 21 is rotated, the encoding wheel 22 is also rotated. Generally, the light emitter 231 keeps on emitting a light beam toward the light receiver 232, while the encoding wheel 22 is arranged between the lighter emitter 231 and the light receiver 232. As the encoding wheel 22 includes a plurality of slits 221 and mask 222 alternatively and peripherally arranged around the perimeter of the encoding wheel 22. As a result, when the encoding wheel 22 is rotated between the light emitter 231 and the light receiver 232, the light beam can freely pass through the slit 221, i.e. an "On" signal, and be blocked by the mask 222, an "Off" signal. Therefore, the numbers of the On/Off signals can be used to calculate the rotations of the encoding wheel 22. After the signals are processed through the circuitry 3, the cursor on the screen can be easily and accurately moved and controlled.

In the conventional encoding mechanism, the vertical and horizontal movement or resolution of the cursor on the screen is proportional to the ratio between the tracing ball 1 and the encoding wheel 22, i.e. how many rotations of the encoding wheel 22 can be achieved when the tracing ball 1 rotates once.

In general, the resolution DPI (Dot Per Inch) can be expressed by the following formula:

$$DPI = 25.4 \times 4 \times T/2\pi R,$$

in which

DPI: Resolution

T: Numbers of the slits on the encoding wheel

R: Diameter of the contacting portion of the shaft

In order to increase the resolutions, the following approaches have been suggested.

1. Reducing the diameter of the shaft, to increase the ration between the tracing ball and the shaft. However, the strength of the shaft is compromised when the diameter is reduced.
2. Increasing the slits and masks around the perimeter of the encoding wheel. However, this will inevitably increase the overall size of the encoding wheel and this is not acceptable.
3. Increasing the number of the slits and masks by reducing the size thereof. However, when the dimension of the slits and masks is reduced, the light emitter and receiver shall be changed accordingly, for example, to use a cap-type photocell. Otherwise, it is unlikely that the receiver can adequately pick up the light signal passing through the slits. In addition, when the numbers is increased, the dimension of the mask is also reduced. This makes the encoding wheel more vulnerable to damage. On the other hand, it is not cost-effective to make such an encoding wheel.

Another approach of the prior art is providing software which can convert the signal generated from the encoding wheel and the sensor such that the vertical and horizontal movement of the cursor on the screen can be increased. For example, if we set the original cursor movement corresponding to a signal unit is 1 unit, after the process of the software, the movement can be enlarged to 2 units, 3 units, or even 4 units, i.e. the cursor can move to an intended position faster than before. However, when the movement unit of the cursor is increased, the resolution of the cursor is accordingly decreased. It is hardly to use the cursor to control a tiny movement of the cursor.

SUMMARY OF THE INVENTION

It is an objective of this invention to provide an encoding device in which a gearing is incorporated such that signal generated thereof can be efficiently propagated without compromising the resolution thereof.

In order to achieve the object set forth, an encoding device in which signals generated thereof can be efficiently propagated in accordance with the present invention comprises a housing and a tracing ball rotatably arranged on said housing. An encoding assembly including a pair of encoding wheels is mechanically arranged adjacent to said tracing ball and driven by said tracing ball. Pair of light emitters and receivers is arranged respectively to opposite sides of each encoding wheel to generate signals. A gearing including first and second gears is arranged between the tracing ball and the encoding assembly such that number of said signals can be increased.

BRIEF DESCRIPTION OF THE DRAWINGS

Other objects and advantages of the present invention will become apparent from the following detailed description of the preferred embodiments thereof taken in conjunction with the accompanying drawings wherein.

DETAILED DESCRIPTION OF THE PREFERRED EMBODIMENT

Figure 1:
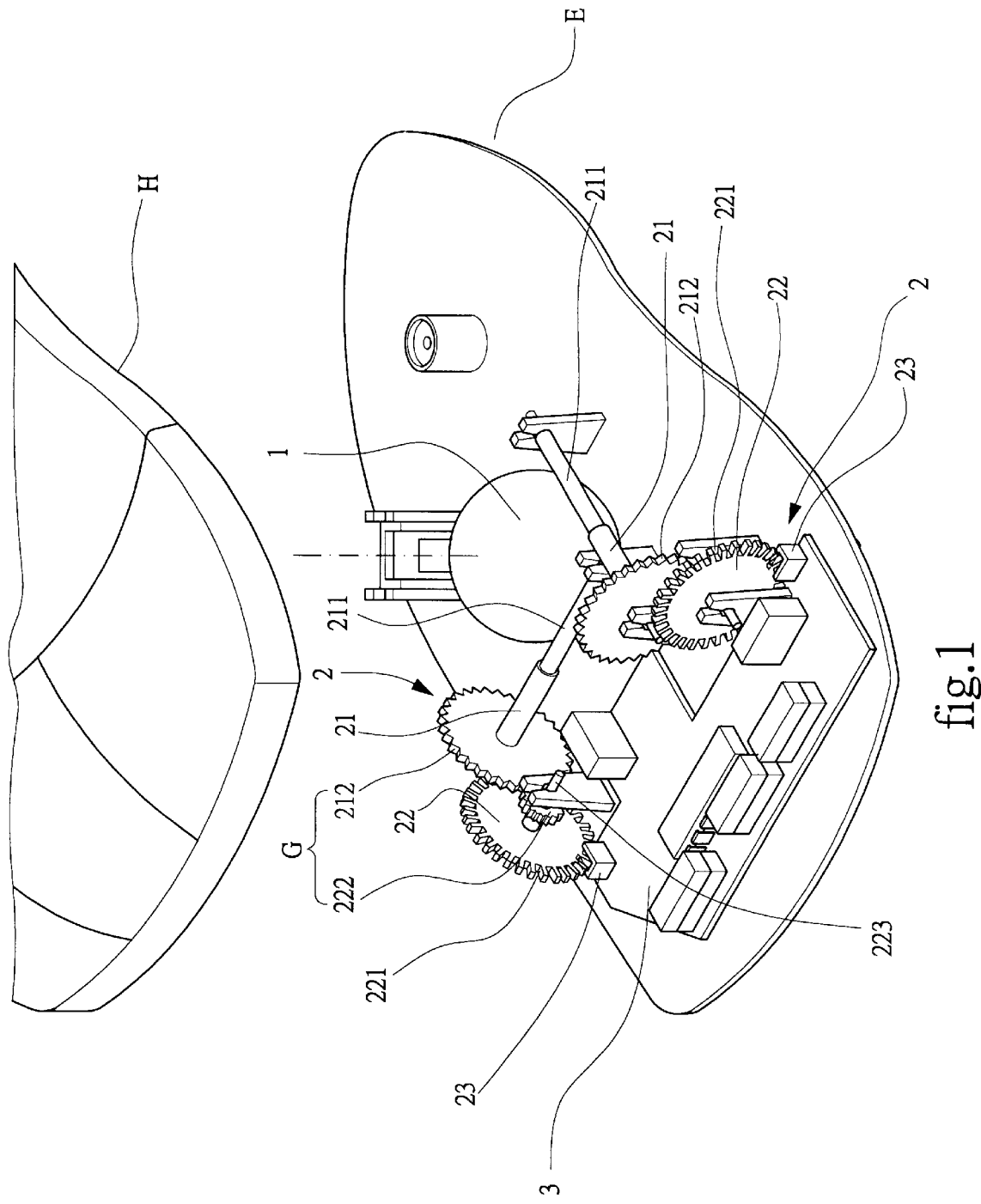
FIG. 1 is an assembled view of an encoding device in accordance with the present invention.
Figure 2:
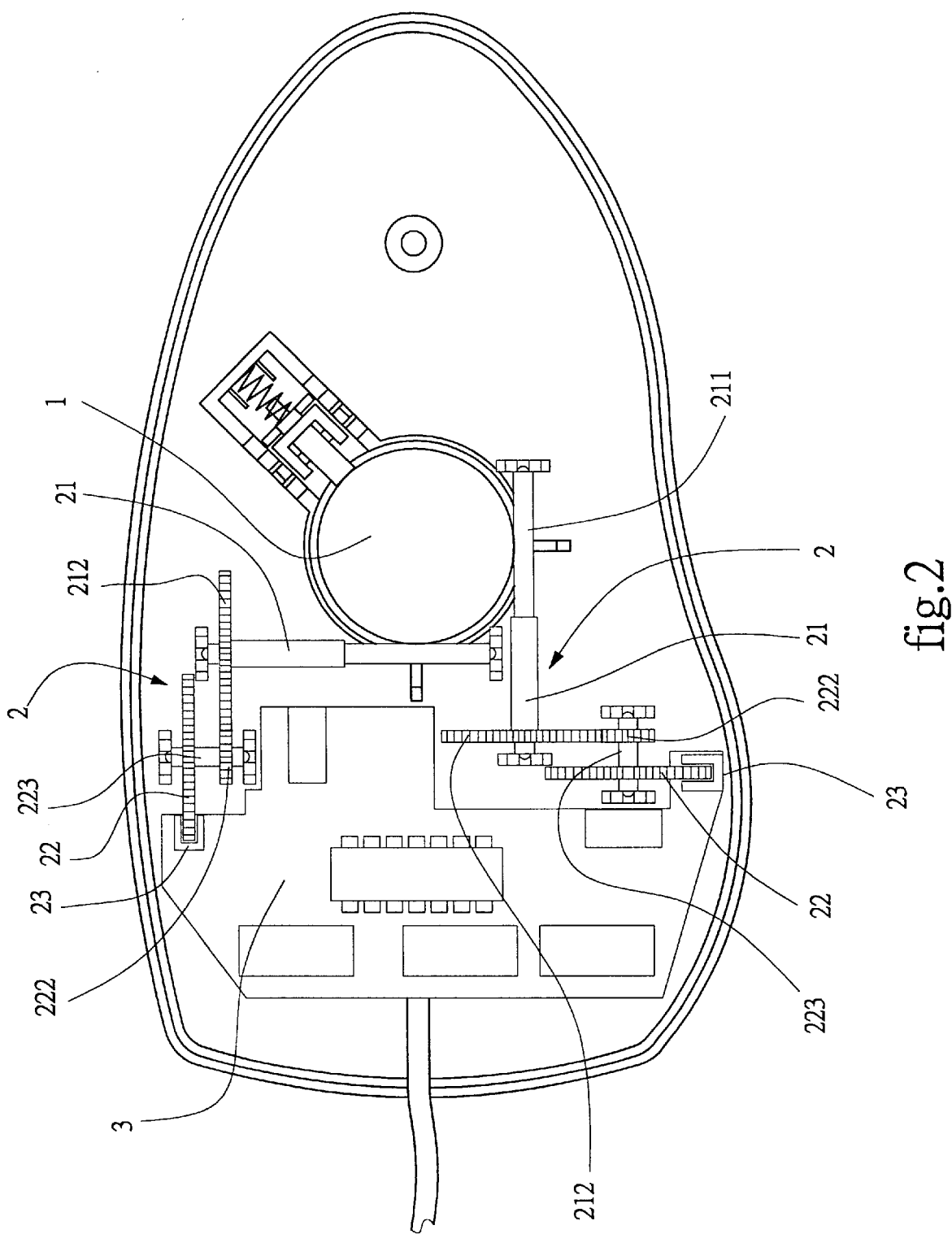
FIG. 2 is a perspective view of FIG. 1.
Figure 3:
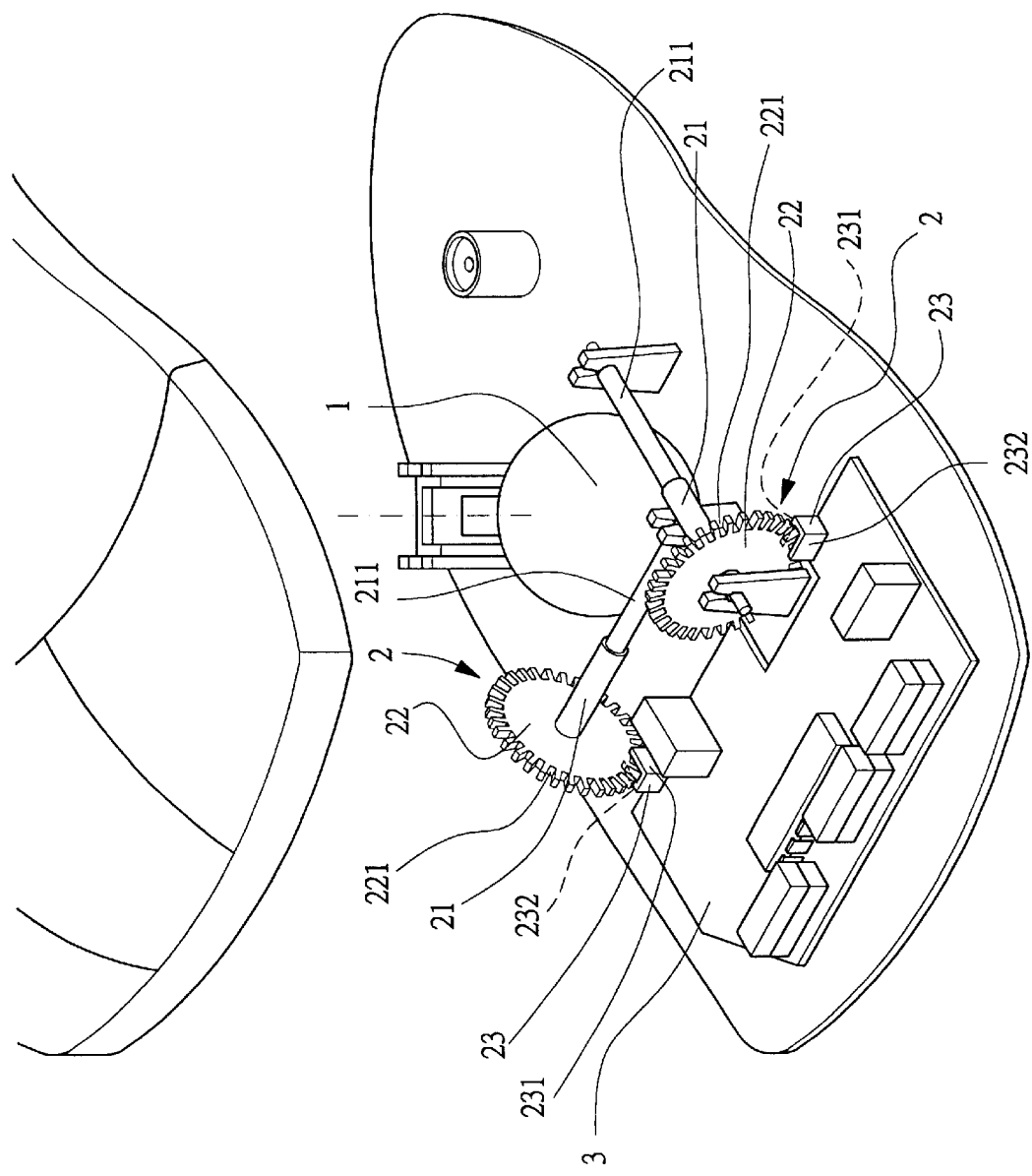
FIG. 3 is an assembled view of a prior art in accordance with the encoding device.

Referring to FIGS. 1 and 2, an encoding device E in which signals generated thereof can be efficiently propagated in accordance with the present invention comprises a housing H and a tracing ball 1 rotatably arranged on the housing H. A pair of encoding members 2 is mechanically arranged adjacent to the tracing ball 1 and driven by the tracing ball 1. The encoding assemblies 2 are arranged in orthogonal to each other. Each encoding assembly 2 includes an encoding wheel 22 rotatably supported on the housing H by a first shaft 22a.

A pair of sensors 23 is arranged respectively to each encoding wheel 22. Each sensor 23 includes a light emitter 231 and a light receiver 232 arranged in opposite side of the encoding wheel 22. While the encoding wheel 22 is rotated as the tracing ball 1 is moved, the photocell 23 can pick up the rotation of the encoding wheel 22 through the slit 221 arranged in the perimeter of the encoding wheel 22. The pick-up is then transferred to a circuitry 3 for further processing the displacement of the cursor. As a result, the cursor is moved to the intended position on the screen. Since the working principle of the sensor 23 and the encoding wheel 22 is known to the skilled in the art, and not further description is given.

A gearing G including first and second gears 222, 212 is arranged between the tracing ball 1 and the encoding assembly 2 such that number of the signals can be largely increased.

The first gear 222 is fixedly assembled to the first shaft 223 of the encoding wheel 22. The second gear 212 is fixedly attached to a second shaft 21 which is rotatably supported to the housing H. The first and second gears 222 and 212 are rotationally meshed together. The second shaft 21 further includes a friction portion 211 which is in contact with the outer surface of the tracing ball 1. Accordingly, when the tracing ball 1 is moved, the second gear 212 is also rotated as the second shaft 21 is rotated through the friction portion 211. While the second gear 212 is rotated, the first gear 222 is also rotated. Finally, the encoding wheel 22 is also rotated by the first shaft 223.

The number of the teeth of the first and second gears 222 and 212 can be specially arranged to increase the rotation of the encoding wheel 22. For example, if the teeth number of the first gear 222 is 10, while the teeth number of the second gear 212 is 20. As a result, the rotation of the encoding wheel 22 will be doubled when the second gear 212 rotates through a cycle. Consequently, the displacement of the cursor on the screen can be easily increased without any compromise. The resolution can be also increased accordingly.

Since there is enough room in the existing housing to accommodate a third gear between first and second gears, consequently, the rotations of the encoding wheels can be easily increased thereby benefiting the displacement of the cursor.

While specific illustrated embodiment has been shown and described, it will be appreciated by those skilled in the-art that various modifications, changes, and additions can be made to the invention without departing from the spirit and scope thereof as set forth in the following claims.

What is claimed is:

1. An encoding device in which signals generated thereof can be efficiently propagated comprising:

a housing;

a tracing ball rotatably arranged on said housing;

an encoding assembly including a pair of encoding wheels mechanically arranged adjacent to said tracing ball and driven by said tracing ball;

a sensor arranged adjacent to said encoding member to generate signals in cooperation with said encoding wheel;

pairs of light emitters and receivers arranged respectively to opposite sides of the encoding wheels; and a gearing including first and second gears arranged between the tracing ball and said encoding assembly such that the number of said signals is increased, wherein the teeth number of said first gear is smaller than said second gear such that the rotation of said encoding wheel is considerably increased and signal generated thereof is efficiently propagated without compromising the resolution thereof.

\* \* \* \* \*